(12) United States Patent
Zborowski et al.

(10) Patent No.: US 6,274,525 B1
(45) Date of Patent: Aug. 14, 2001

(54) PROCESS FOR MAKING A HIGH TEMPERATURE-RESISTANT CERAMIC MATERIAL WITH AN ADJUSTABLE THERMAL EXPANSION COEFFICIENT AND METHOD OF USE OF SAME

(75) Inventors: Janusz Zborowski, Ingelheim; Uwe Eichhorn; Bartolome Aloy-Dols, both of Mainz, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/359,273

(22) Filed: Jul. 22, 1999

(51) Int. Cl.⁷ ..................................................... C04B 35/03
(52) U.S. Cl. ........................................... 501/120; 501/124
(58) Field of Search ....................................... 501/120, 124

(56) References Cited

U.S. PATENT DOCUMENTS

| | | |
|---|---|---|
| 4,400,474 | 8/1983 | Copperthwaite . |
| 4,729,974 * | 3/1988 | Nazirizadeh et al. ............... 501/120 |
| 4,780,434 * | 10/1988 | Watanabe et al. ................... 501/120 |
| 5,021,374 * | 6/1991 | Macey ................................ 501/120 |
| 5,283,215 * | 2/1994 | Hosokawa et al. .................. 501/120 |
| 5,565,390 * | 10/1996 | Nievoll ............................... 501/120 |
| 5,569,631 * | 10/1996 | Harmuth et al. ..................... 501/120 |

FOREIGN PATENT DOCUMENTS

| | | |
|---|---|---|
| 1 471 174 | 12/1970 | (DE) . |
| 195 18 468 A1 | 11/1996 | (DE) . |
| 0531130 * | 3/1993 | (EP) . |
| 0 739 864 A1 | 10/1996 | (EP) . |

OTHER PUBLICATIONS

"Mechanical Properties of Model Mangesia–Spinel Compositematerial", by C. Aksel, et al, School of Materials, University of Leeds, Leeds LS2 9JT, UK; Key Engineering Materials vols. 132–136 (1997), pp. 1774–1777, Trans Tech Publications, Switzerland.

"Periklas–Spinel Products With Improved Properties By Targeted TIO2 Additives", by Wolfgang Schulle, et al, Veitsch–Radex Rundschau 1–2, 1995, pp. 563–567.

"Sintered MgO Clinker Containing Al2O3", by Kaneyasu, Akira et al, Technical Div., Ube Chemical Ind. Col. Ltd., Ube, Japan, and Shima Hiromi, Faculty of Engineering, Yamaguchi Univ., Ube, Japan, published in "Global Development of Refractors", Proc. of the UNITECR'95 Congress, Kyoto, Japam, Nov. 19–22, 1995, pp. 550–557.

"Magnesio–Aluminate Spinel—A Potential Raw Material . . . ", By G Gosh et al, Tata Refractories Limited, India, published in "Global Development of Refractories", Proc. of the UNITERC'95 Congress, Kyoto, Japan, Nov. 19–22, 1995, pp. 541–549.

Patent Abstracts of Japan vol. 1995, No. 08, Sep. 29, 1995 & JP 07 126061, May 16, 1995.

* cited by examiner

*Primary Examiner*—Elizabeth D. Wood
(74) *Attorney, Agent, or Firm*—Michael J. Striker

(57) ABSTRACT

The process for making the high temperature-resistant ceramic material from the MgO—Al$_2$O$_3$ system includes burning a mixture containing a predetermined amount of magnesium oxide (MgO) of a predetermined grain size distribution in an amount range of from 30 to 99 parts by weight and a predetermined amount of magnesium aluminate (MgAl$_2$O$_4$) of another different predetermined grain size distribution in a range of from 1 to 70 parts by weight to obtain a ceramic product having a thermal expansion coefficient and selecting the amounts of magnesium oxide and magnesium aluminate as well as the predetermined grain size distributions so that the thermal expansion coefficient of the ceramic product is substantially equal to that of platinum and platinum alloys and in a range of from $9 \times 10^{-6}$ $K^{-1}$ to $15 \times 10^{-6}$ $K^{-1}$.

24 Claims, No Drawings

PROCESS FOR MAKING A HIGH TEMPERATURE-RESISTANT CERAMIC MATERIAL WITH AN ADJUSTABLE THERMAL EXPANSION COEFFICIENT AND METHOD OF USE OF SAME

BACKGROUND OF THE INVENTION

1. Field of the Invention

The present invention relates to a process for making a high temperature-resistant ceramic material with an adjustable thermal expansion coefficient $\alpha_{30-1400}$° C. in the range of that of platinum and its alloys, namely from $9\times10^{-6}$ $K^{-1}$ to $15\times10^{-6}$ $K^{-1}$, and method of use of this ceramic material.

2. Prior Art

Magnesia materials have been known for a long time as fire-resistant materials, especially in the form of firebrick or refractory brick, and have attained great importance in the last 30 years, e.g. as furnace brick in the glass industry, as working lining in pig iron mixers. They are also used in rotary kilns or furnaces in the cement industry.

The features of magnesia brick and thus its manufacture are determined by the particular application involved. Conventional bricks have a high cold compressive strength, a low porosity and soften under load in oxidizing atmospheres over about 1400° C.

In general their resistance to changes in temperature is not very good, since the thermal expansion at 1400° C. can already reach 2%.

Considerable improvements may be attained here by using flux-poor, especially iron-poor, sintered magnesia as a raw material, by variations of the grain structure, of the degree of packing or bulk factor or also by additives, for example spinel ($MgAl_2O_4$) or chromium ore. The proportion of magnesia spinel brick has clearly increased in recent years in relation to the costs of the chrome ore containing embodiments because of environmental problems.

A composite body comprising one part metallic titanium and another part ceramic substance based on the magnesium oxide-aluminum oxide-titanium dioxide system is described in DE-AS 1 471 174. This composite body is characterized by an at least partially chemical binding between titanium and ceramic. This is clearly necessarily due to the content of titanium dioxide.

The composite body may contain no identifiable silicic acid-containing ceramic. The composite body is used from making vacuum tubes. The process described in DE AS 1 471 174 produces the composite body by a mixed precipitation. In contrast, the ceramic material according to the present invention is made exclusively by sintering and/or fusion processes.

A ceramic material made from at least two metal oxides in which the metals have two different valences is, for example, disclosed in European Patent Document EP 0 739 864 A1, in which spinel is the main phase and the oxide of the metal with the lower valence is present in the spinel matrix above the stoichiometric ratio of 1:1 and dissolved in it. The metallic part of the first oxide is magnesium and the metallic part of the second oxide is aluminum.

This type of ceramic material according to EP 0 739 864 A1 is employed in the chemical industry, the metals industry and the ceramic industry, where for example alkaline media at elevated temperatures enclosed in a gas and/or liquid-tight vessel containers must be conducted in pipes or must be separated by it.

In this type of material however the amount of magnesium oxide present must be small enough so that the MgO in the spinel remains dissolved and only the spinel is identified as a single phase by X-ray photographic methods.

DE 195 18 468 A1 discloses use of a fire-resistant cast body based on a hydrated ion-sensitive metal oxide, such as MgO, with a carbon content, a dispersing agent and a reactive silicic acid for coating or repair of the erosion-endangered regions of a metallurgical smelting vessel.

Other literature relating to the $MgO/Al_2O_3$-Spinel material, include for example:

"MAGNESIO-ALUMINATE SPINEL—A POTENTIAL RAW MATERIAL FOR MAKING NEW GENERATION REFRACTORIES" by B. Ghosh, P. Chakraborty, P. G. Pal, S. K. Mitra and K. S. Swaminathan; Tata Refractories Limited, India, published in "Global Development of Refractories", Proc. Of the UNITECR '95 Congress, Kyoto, Japan, Nov. 19 to 22, 1995, pp. 541 to 549.

"SINTERED MgO CLINKER CONTAINING $Al_2O_3$", of Kaneyasu, Akira and Shimmatsu, Satoshi, Technical Div., Ube Chemical Ind. Col. Ltd., Ube, Japan, and Shima, Hiromi, Faculty of Engineering, Yamaguchi, Univ., Ube, Japan, published in "Global Development of Refractories", Proc. of the UNITECR '95 Congress, Kyoto, Japan, Nov. 19 to 22, 1995, pp. 550 to 557.

"PERIKLAS-SPINEL PRODUCTS WITH IMPROVED PROPERTIES BY TARGETED $TiO_2$ ADDITIVES" by Wolfgang Schulle, Ph. Gia Khanh and Vu Tuan Anh, published in Veitsch-Radex Rundschau 1–2, 1995, pp. 563 to 567.

"MECHANICAL PROPERTIES OF MODEL MAGNESIA-SPINEL COMPOSITE MATERIAL" by C. Aksel, R. W. Davidge, P. D. Warren and F. L. Riley, School of Materials, University of Leeds, Leeds LS 2, 9JT, UK, published in Key Engineering Materials, Vols. 132 to 136 (1997), pp. 1774 to 1777; 1997 Trans. Tech. Publications, Switzerland.

None of the above literature disclose or suggest the purpose and solution of the present invention.

Components made from refractory ceramics and metal-coated refractory ceramics are used in glass smelting furnaces and in hot forming of glass bodies. The fire-resistant ceramic "supporting" materials currently used have thermal expansion coefficients of about $0.5\times10^{-8}$ $K^{-1}$ (quarzal) to about $8\times10^{-6}$ $K^{-1}$ (sillimanite, mullite, $\alpha$-alumina) in a temperature range of from 30 to 1400° C. These values are clearly lower than those for platinum and Pt alloys with $\alpha_{30-1400}$° C. of $11.5\times10^{-6}$ $K^{-1}$. A frequent cause of failure of these components has been shown by damage control analysis to be faults and fractures in the platinum casing which arise because of the different thermal expansion coefficients of both materials.

SUMMARY OF THE INVENTION

It is an object of the present invention to provide a method of making a fire-resistant ceramic material with a thermal expansion coefficient that is adjustable to that of platinum and its alloys.

It is another object of the present invention to provide a ceramic material with a composition, grain structure, forming methods, combustion conditions and other properties, such as mechanical strength, thermomechanical properties, workability by rotation, grinding and drilling, which can be optimized so that they come close to those of the currently used marterials, such as sillimanite and mullite.

These objects are attained according to the invention by a process comprising the steps of burning a mixture of ingredients containing between 30 and 99 parts by weight magnesium oxide (MgO) and from 1 to 70 parts by weight of magnesium aluminate (Mg Al$_2$O$_4$) in respective amounts and different grain size distributions and selecting the amounts of the ingredients and their grain size distributions so as to adjust the thermal expansion coefficient of the resulting mixture according to the invention, i.e. the ceramic product, to that of platinum and/or its alloys.

These objects are also attained by a process comprising burning mixtures of ingredients including from 1 to 70 parts by weight MgAl$_2$O$_4$ and MgO in respective different amounts and grain size distributions with a sufficiently large excess of the MgO such that no further addition of ingredients for forming MgO is required and selecting the amounts of the ingredients and their grain size distributions so as to adjust the thermal expansion coefficient of the resulting mixture according to the invention, i.e. the ceramic product, to that of platinum and/or its alloys.

The fire-resistant and thermomechanical properties of the ceramic according to the invention may be adjusted to fit the particular application for the component produced by adjusting the composition, grain structure and the process conditions.

Other properties such as mechanical strength and workability by turning, grinding and drilling are very close to those of the currently used materials, such as sillimanite and mullite, or indeed even improved.

The products or ceramic materials according to one embodiment of the invention are formed from mixtures with from 30 to 99 parts by weight MgO and from 1 to 70 parts by weight MgAl$_2$O$_4$. Sintered magnesite is preferred for the MgO ingredient and magnesium aluminate spinel is preferred for the MgAl$_2$O$_4$. Grain size fractions<0.1 mm, 0 to 1 mm and 1 to 5 mm of the MgO and MgAl$_2$O$_4$ are used.

The respective grain size spectrum of the raw materials used can be adjusted to the size of the parts being made and to special requirements, such as the surface quality or roughness of the molded body to be worked. For example, a maximum grain size of from 0.01 mm, 0.1 mm 1 mm or 5 mm may be used and the grain size distribution, i.e. the proportion of the individual grain size fractions, generally is selected according to the principle of the tightest possible packing.

The mixture usually contains from 0 to 10 parts by weight, especially from 1.5 to 7 parts by weight, of calcium aluminate cement as an additive and from 0 to 10 parts by weight, especially 2 to 8 parts by weight, microsilica. It also contains from 0 to 12 parts by weight, especially 1 to 10 parts by weight, of water.

In another preferred embodiment of the product according to the invention a press is employed in a forming or molding method instead of using a hydraulic binding with calcium aluminate cement (CA cement), so that no additives of microsilica and CA cement are introduced, but an organic press-assisting agent and/or a binder in an amount of from 0 to 20 parts by weight and/or water in an amount of 0 to 12 parts by weight are used.

In another alternative embodiment an additive consisting of from 0.0 to 0.5 parts by weight of a foam-forming agent, e.g. anionic surfactant with a stabilizer, e.g. polysaccharide, and/or from 0 to 20 parts by weight of a pore-forming, e.g. combustible, substance, such as plastic granulate, are mixed in the mixture in order to provide a predetermined pore size and thus to lower and adjust the density and thermal conductivity of the product.

The mixture can also contain an organic additive as a binder, press-assisting additives, foam-forming agents, pore-forming combustible substances in an amount of from 0 to 20 parts by weight. In a preferred embodiment the ingredients for formation of Mg Al$_2$O$_4$ are present in amounts which are exactly stoichiometric in regard to forming the compound Mg Al$_2$O$_4$. It is also possible according to the invention to provide the ingredients for formation of the Mg Al$_2$O$_4$ in over-stoichiometric amounts with either an excess of Al$_2$O$_3$ or MgO.

In summary it can be said that according to the invention the carrier substances for the magnesium aluminate can be employed so that they are present in amounts that are exactly stoichiometric for production of Mg Al$_2$O$_4$ or an excess of the starting materials MgO or Al$_2$O$_3$ may be used. It is also possible in one embodiment to use a sintered or fused product with correspondingly high MgO excess so that the additional use of an MgO carrier substance is not required and a sintered or fused product is used as the principal ingredient. In alternative embodiments fused commercial product, such as CerMagFX or CerMag 67 of CERMATCO Ltd., can be used as the carrier substrates for magnesium oxide and magnesium aluminate.

The invention is illustrated in greater detail hereinbelow with the aid of the following four examples.

EXAMPLES

Example 1

Two principal components, magnesium oxide in the form of sintered magnesite and magnesium aluminate in the form of MA spinel sinter, are homogenized in a mixer in the following stated grain fractions and weight proportions with the additives, calcium aluminate (CA) cement, microsilica and water (values of the parts are based on the total amount of the principal components), and are worked into a mass, which is packed into a mold by means of vibration technology.

| Sintered magnesite (MgO) | |
|---|---|
| <0.1 mm | 35% |
| 1 to 3 mm | 30% |

| MA Spinel sinter (MgAl$_2$O$_4$) | |
|---|---|
| 0 to 1 mm | 15% |
| 1 to 3 mm | 20% |

Additive Ingredients (Parts Based on the Total Amount of the Principal Ingredients):

| | |
|---|---|
| CA cement | 6% (e.g. CA-25 ® of ALCOA) |
| Microsilica | 3% (e.g. silubite FB 10 ® of Zschimmer & Schwarz) |
| Water | 6% |

After a setting time for the CA cement of about 24 h a blank is molded and dried at about 110° C. to constant weight.

Subsequently this intermediate product is burned in an electrically heated furnace according to the following temperature program:

| | | |
|---|---|---|
| 100 K/h | 1400° C. | 6 h |
| 100 K/h | 1000° C. | 0 h. |

Cooling to room temperature (heat turned off)

The product made by the above-described process has a thermal expansion behavior that is very well matched to that of PtRh10 alloy.

The values of the corresponding thermal expansion coefficients amount to:

| | PtRh10 | M-MA Material(MgO—MgAl$_2$O$_4$) (according to example 1) |
|---|---|---|
| $\alpha_{30-1400°\ C.}$ [1/K] 10$^{-6}$ | 11.6 | 11.0 |
| $\alpha_{1000-1300°\ C.}$ [1/K] 10$^{-6}$ | 13.3 | 13.5 |

The materials made according to the above example can be mechanically worked in both the burned and unburned state, similar to the current ceramic-noble metal composites based on sillimanite and mullite and they have a similar mechanical strength.

Example 2

This example utilizes the same process as example 1, with the following changes in the proportion and grain size fraction of the principal components:

| Sintered magnesite (MgO) | |
|---|---|
| <0.1 mm | 15% |
| 0 to 1 mm | 30% |
| 1 to 3 mm | 30% |

| MA Spinel sinter (MgAl$_2$O$_4$) | |
|---|---|
| <0.1 mm | 20% |
| 0 to 1 mm | 5% |

The product, like that made in example 1, has values of the thermal expansion coefficient which are about 2% greater than those for PtRh10 alloy in a temperature range of from 30 to 1400° C.

| | PtRh10 | M-MA Material(MgO—MgAl$_2$O$_4$) (according to example 2) |
|---|---|---|
| $\alpha_{30-1400°\ C.}$ [1/K] 10$^{-6}$ | 11.6 | 11.8 |
| $\alpha_{1000-1300°\ C.}$ [1/K] 10$^{-6}$ | 13.3 | 14.5 |

Because of that tensile stress or strain is not produced in the metal surrounding the ceramic material at temperatures of from 800 to 1400° C. so that formation of faults or imperfections can be effectively prevented. Also the hydrated ion resistance of this product is substantially higher than that of the embodiment of example 1 after combustion because of the clearly smaller fraction of fine-grained sintered magnesite (<0.1 mm).

Example 3

This example utilizes the same process as example 1, with the following changes in the proportion and grain size fraction of the principal components:

| Sintered magnesite (MgO) | |
|---|---|
| <0.1 mm | 5% |
| 0 to 1 mm | 75% |

| MA Spinel sinter (MgAl$_2$O$_4$) | |
|---|---|
| <0.1 mm | 20% |

The product, like that made in example 1, has values of the thermal expansion coefficient which are similar to those of example 2.

| | PtRh10 | M-MA Material (MgO—MgAl$_2$O$_4$) (according to example 2) |
|---|---|---|
| $\alpha 30-1400°$ C. [1/K] 10$^{-6}$ | 11.6 | 11.6 |
| $\alpha 1000-1300°$ C. [1/K] 10$^{-6}$ | 13.3 | 14.8 |

Because of the clearly finer grain structure this embodiment is characterized by a reduced surface roughness for mechanical processing and is suitable for smaller components with a complicated form, in which complex geometries must be mechanically worked with close tolerances.

Example 4

Two principal ingredients, magnesium oxide in the form of sintered magnesite and magnesium aluminate in the form of sintered MA spinel, were homogenized with the same grain size fractions and proportions as in examples 1 to 3 and were pressed isostatically or uniaxially in respective suitable molds with the help of a hydraulic press after additional of from 0 to 5% water and/or an organic press assisting agent. The pressed blanks are subsequently dried at about 110° C. to constant weight and burned at a maximum combustion temperature of 1700° C. The product in this embodiment has improved thermomechanical properties in comparison to those of examples 1 to 3. The fire-resistant ceramic according to the invention that is formed using the hydraulic press as a shaping tool avoids the additives, e.g. CA cement and microsilica, which form a relatively low melting eutectic which has a negative influence on the thermomechanical properties of the material. This permits the use of the product at temperatures in a range above 1600° C. under mechanical load.

Damage which currently occurs because of different thermal expansion coefficients of noble metal/noble metal alloys and the fire-resistant material can be avoided when the material according to the invention is used in place of ceramic materials in contact with platinum or coated with platinum or Pt alloys. Furthermore the material according to the invention facilitates improved or new shaping or molding methods which result in hitherto unachievable product improvements because the thermal expansion coefficients of the material are adjusted to the surrounding metal.

Exemplary Application

Ceramic supporting bodies on a special mandrel (platinum (PtRh10)-coated) of a Danner tube drawing unit for glass tubing made according to the present invention had at least 20 times the service life of a conventional mandrel. An up-to-now unattainable long duration low level of wall thickness differences (WDU) of $\leq 2$ to 3% is attained. This provides a great improvement in quality and manufacturing costs as a result.

The average service life of a conventional mandrel—slurry-cast alumino-silicate ceramic (fire clay), without platinum coating—amounts to about 14 to 20 days. The replacement of the mandrel occurs chiefly because of draw streaks and/or too great wall thickness differences.

The service life of a first special mandrel with a ceramic carrier material according to this invention, made with a platinum coating, amounts to over 300 days without interruption, without draw streaks, without crystals. Multiple use of the ceramic body is possible.

In Summary:

| Conventional mandrel | Special mandrel according to the invention |
|---|---|
| About 2 to 7% WDU | 2 to 3% WDU |
| WDU value increases with time during use | remains constant |

While the invention has been illustrated and described as embodied in a process for making a high temperature-resistant ceramic material with an adjustable thermal expansion coefficient and method of use of same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A process for making a high temperature-resistant ceramic material for a component, said component comprising platinum or a platinum alloy in contact with the high temperature-resistant ceramic material and said high temperature ceramic material comprising a MgO—$Al_2O_3$ system with a predetermined thermal expansion behavior, said process comprising the steps of:

a) burning a mixture containing a predetermined amount of magnesium oxide (MgO) of a predetermined grain size distribution in an amount range of from 30 to 99 parts by weight and a predetermined amount of magnesium aluminate ($MgAl_2O_4$) of another different predetermined grain size distribution in an amount range of from 1 to 70 parts by weight to obtain a product having a thermal expansion coefficient ($\alpha$), wherein said predetermined grain size distribution and said another different predetermined grain size distribution consist of respective grain size fractions, said respective grain size fractions including a <0.1 mm grain size fraction, a 0 to 1 mm grain size fraction and a 1 to 5 mm grain size fraction; and b) selecting said predetermined amounts of said magnesium oxide and said magnesium aluminate as well as said predetermined grain size distributions so that said thermal expansion coefficient of said product is substantially equal to that of said platinum or said platinum alloy and in a range of from $9\times10^{-6}$ $K^1$ to $15\times10^{-6}$ $K^{-1}$.

2. The process as defined in claim 1, wherein said magnesium oxide is sintered magnesite and said magnesium aluminate is magnesium aluminate spinel.

3. The process as defined in claim 1, wherein said mixture contains from 0 to 10 parts by weight of calcium alumina cement as an additive.

4. The process as defined in claim 3, wherein said mixture contains from 1.5 to 7 parts by weight of said calcium alumina cement.

5. The process as defined in claim 1, wherein said mixture contains from 0 to 10 parts by weight of microsilica as an additive.

6. The process as defined in claim 5, wherein said mixture contains from 2 to 8 parts by weight of said microsilica.

7. The process as defined in claim 1, wherein said mixture contains from 0 to 12 parts by weight of water as an additive.

8. The process as defined in claim 7, wherein said mixture contains from 1 to 10 parts by weight of said water.

9. The process as defined in claim 1, wherein said mixture contains from 0 to 20 parts by weight of at least one organic additive selected from the group consisting of organic binders, organic press-assisting agents, organic foam-forming agents and organic pore-forming agents.

10. The process as defined in claim 1, further comprising the step of pre-sintering said mixture of said magnesium oxide and said magnesium aluminate prior to said burning.

11. The process as defined in claim 1, further comprising the step of forming said mixture from said magnesium oxide and said magnesium aluminate and wherein said magnesium oxide and said magnesium aluminate are each sintered or melted prior to forming said mixture.

12. A process for making a high temperature-resistant ceramic material for a component, said component comprising platinum or a platinum alloy in contact with the high temperature-resistant ceramic material and said high temperature ceramic material comprising a MgO—$Al_2O_3$ system with a predetermined thermal expansion behavior, said process comprising the steps of:

a) burning a mixture containing a predetermined amount of magnesium aluminate ($MgAl_2O_4$) of a predetermined grain size distribution in a range of from 1 to 70 parts by weight with magnesium oxide (MgO) in an excess amount in another different predetermined grain size distribution large enough so that no added magnesium oxide is required so as to obtain a product having a thermal expansion coefficient ($\alpha$), wherein said predetermined grain size distribution and said another different predetermined grain size distribution consist of respective grain size fractions, said respective grain size fractions including a <0.1 mm grain size fraction, a 0 to 1 mm grain size fraction and a 1 to 5 mm grain size fraction; and b) selecting said predetermined amount of said magnesium aluminate and said excess amount of said magnesium oxide ingredients as well as said predetermined grain size distributions so that said thermal expansion coefficient of said product is substantially equal to that of said platinum or said platinum alloy and in a range of from $9\times10-6$ $K^{-1}$ to $15\times10^{-6}$ $K^{-1}$.

13. The process as defined in claim 13, wherein said mixture contains from 0 to 10 parts by weight of calcium alumina cement as an additive.

14. The process as defined in claim 13, wherein said mixture contains from 1.5 to 7 parts by weight of said calcium alumina cement.

15. The process as defined in claim 12, herein said mixture contains from 0 to 10 parts by weight of microsilica as an additive.

16. The process as defined in claim 15, wherein said mixture contains from 2 to 8 parts by weight of said microsilica.

17. The process as defined in claim 12, wherein said mixture contains from 0 to 12 parts by weight of water as an additive.

18. The process as defined in claim 17, wherein said mixture contains from 1 to 10 parts by weight of said water.

19. The process as defined in claim 12, wherein said mixture contains from 0 to 20 parts by weight of at least one organic additive selected from the group consisting of organic binders, organic press-assisting agents, organic foam-forming agents and organic pore-forming agents.

20. The process as defined in claim 12, further comprising the step of pre-sintering said mixture of said magnesium oxide and said magnesium aluminate prior to said burning.

21. The process as defined in claim 12, further comprising the step of forming said mixture from said magnesium oxide and said magnesium aluminate and wherein said magnesium oxide and said magnesium aluminate are each sintered or melted prior to forming said mixture.

22. The process as defined in claim 1, further comprising the steps of forming said magnesium aluminate and, prior to formation of said magnesium aluminate, mixing starting ingredients for forming said magnesium aluminate in stoichiometric amounts for formation of said magnesium aluminate or either with an excess of magnesium oxide or alumina with respect to said stoichiometric amounts.

23. A process for making a high temperature-resistant ceramic material for a component, said component comprising platinum or a platinum alloy in contact with the high temperature-resistant ceramic material and said high temperature ceramic material comprising a MgO—$Al_2O_3$ system with a predetermined thermal expansion behavior, said process comprising the steps of:
   a) burning a mixture consisting of a predetermined amount of magnesium oxide (MgO) of a predetermined grain size distribution in an amount range of from 30 to 99 parts by weight, a predetermined amount of magnesium aluminate ($MgAl_2O_4$) of another different predetermined grain size distribution in an amount range of from 1 to 70 parts by weight, a predetermined amount of from 1.5 to 7 parts by weight of calcium alumina cement, a predetermined amount of from 2 to 8 parts by weight of microsilica and a predetermined amount of from 1 to 10 parts by weight of water to obtain a product having a thermal expansion coefficient ($\alpha$), wherein said predetermined grain size distribution and said another different predetermined grain size distribution consist of respective grain size fractions, said respective grain size fractions including a <0.1 mm grain size fraction, a 0 to 1 mm grain size fraction and a 1 to 5 mm grain size fraction; and
   b) selecting said predetermined amount as well as said predetermined grain size distributions so that said thermal expansion coefficient of said product is substantially equal to that of said platinum or said platinum alloy and in a range of from $9\times10^{-6}$ $K^{-1}$ to $15\times10^{-1}$ $K^{-1}$.

24. A process for making a high temperature-resistant ceramic material for a component, said component comprising platinum or a platinum alloy in contact with the high temperature-resistant ceramic material and said high temperature ceramic material comprising a MgO—$Al_2O_3$ system with a predetermined thermal expansion behavior, said process comprising the steps of:
   a) compressing a mixture consisting of a predetermined amount of magnesium oxide (MgO) of a predetermined grain size distribution in an amount range of from 30 to 99 parts by weight, a predetermined amount of magnesium aluminate ($MgAl_2O_4$) of another different predetermined grain size distribution in an amount range of from 1 to 70 parts by weight, a predetermined amount of up to 20 parts by weight of at least one of an organic press-assisting agent and a binder and a predetermined amount of from 1 to 10 parts by weight of said water in a press to form a compressed mixture, wherein said predetermined grain size distribution and said another different predetermined grain size distribution consist of respective grain size fractions, said respective grain size fractions including a <0.1 mm grain size fraction, a 0 to 1 mm grain size fraction and a 1 to 5 mm grain size fraction;
   b) burning said compressed mixture to obtain a product having a thermal expansion coefficient ($\alpha$); and
   c) selecting said predetermined amount as well as said predetermined grain size distributions so that said thermal expansion coefficient of said product is substantially equal to that of said platinum or said platinum alloy and in a range of from $9\times10^{-6}$ $K^{-1}$ to $15\times10^{-6}$ $K^{-1}$.

* * * * *